United States Patent [19]

Grünewald et al.

[11] Patent Number: 4,830,639
[45] Date of Patent: May 16, 1989

[54] PROCESS FOR TREATING SCRUBBING SOLUTIONS

[75] Inventors: Gerhard Grünewald, Mainz-Gonsenheim; Emil Alunic, Kronberg, both of Fed. Rep. of Germany

[73] Assignees: Metallgesellschaft AG, Frankfurt am Main; Linde AG, Hollriegelskreuth, both of Fed. Rep. of Germany

[21] Appl. No.: 167,563

[22] Filed: Mar. 14, 1988

[30] Foreign Application Priority Data

Mar. 21, 1987 [DE] Fed. Rep. of Germany ....... 3709363

[51] Int. Cl.$^4$ ..................... B01D 19/00; B01D 53/14
[52] U.S. Cl. ......................................... 55/44; 55/48; 55/51; 55/53; 55/68; 55/89
[58] Field of Search .................. 55/44, 48, 51, 53, 68, 55/73, 89; 423/223, 228, 229

[56] References Cited

U.S. PATENT DOCUMENTS

| | | | |
|---|---|---|---|
| 3,121,624 | 2/1964 | Matsch et al. | 55/44 |
| 3,435,590 | 4/1969 | Smith | 55/48 X |
| 3,594,985 | 7/1971 | Ameen et al. | 55/44 |
| 3,880,615 | 4/1975 | Grünewald et al. | 55/44 |
| 4,144,039 | 3/1979 | Blanc et al. | 55/73 |
| 4,252,548 | 2/1981 | Markbreiter et al. | 55/68 X |
| 4,282,194 | 8/1981 | Say et al. | 423/223 |
| 4,302,220 | 11/1981 | Volkamer et al. | 55/73 X |
| 4,381,926 | 5/1983 | Karwat | 55/73 X |
| 4,460,385 | 7/1984 | Pan et al. | 55/73 |
| 4,498,911 | 2/1985 | Deal et al. | 55/73 X |
| 4,551,158 | 11/1985 | Wagner et al. | 55/73 X |
| 4,591,370 | 5/1986 | Gazzi et al. | 55/68 X |
| 4,738,754 | 4/1988 | Hilsebein et al. | 55/44 X |

FOREIGN PATENT DOCUMENTS 1494806 7/1975 Fed. Rep. of Germany .
1196658 7/1970 United Kingdom .

Primary Examiner—Robert Spitzer
Attorney, Agent, or Firm—Herbert Dubno

[57] ABSTRACT

Two absorbent solution streams which come from different gas-scrubbing zones and have absorbed carbon dioxide and at least one of the valuable gases carbon monoxide, hydrogen or methane by physical dissolution under pressures from 10 to 100 bars are treated for a recovery of the valuable gases. For that purpose the first absorbent solution stream is pressure-relieved into a first pressure-relief zone with a pressure reduction by at least 5 bars so that a high-$CO_2$ gas is flashed off. The second absorbent solution stream is partly pressure-relieved into a second pressure-relief zone, which contains exchange-promoting elements. The flashed-off gas from the first pressure relief zone is passed upwardly through the second pressure relief zone in a countercurrent to the second absorbent solution stream. A gas mixture containing $CO_2$ and at least one valuable gas is withdrawn at the top of the second pressure relief zone. The two scrubbing solution streams which have left the pressure-relief zones are then regenerated. The second absorbent solution stream which has left the second pressure relief zone is preferably fed to the first pressure relief zone.

6 Claims, 1 Drawing Sheet

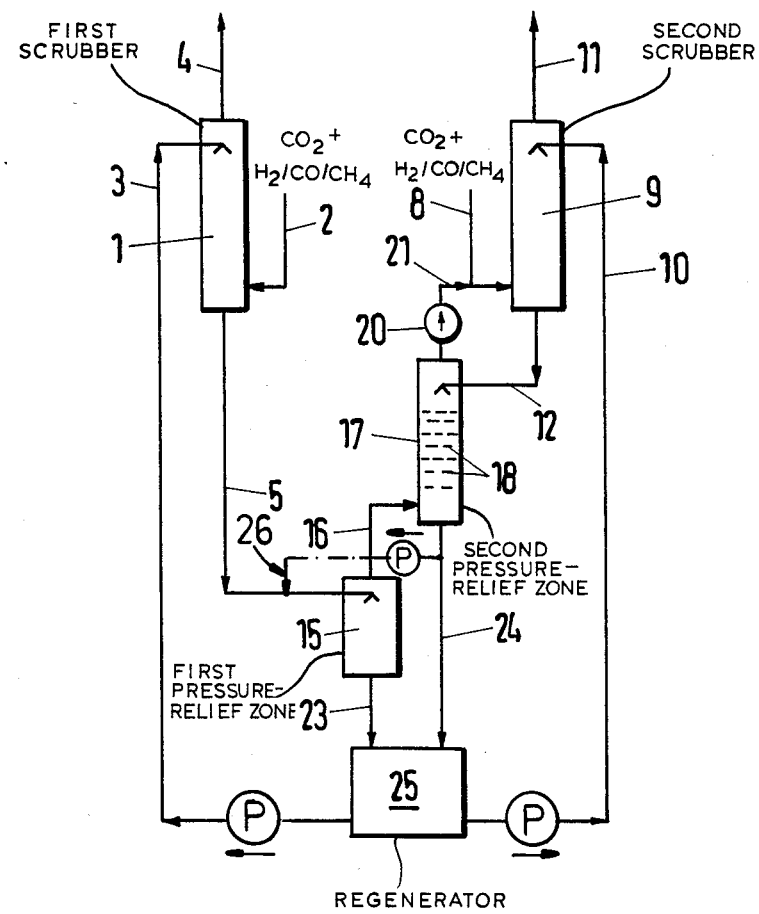

PROCESS FOR TREATING SCRUBBING SOLUTIONS

FIELD OF THE INVENTION

Our present invention relates to a process for treating two laden scrubbing-solution streams which derive from different gas-scrubbing zones and in said zones have absorbed carbon dioxide and at least one of the valuable gases carbon monoxide, hydrogen or methane by physical dissolution under pressures from 10 to 100 bars.

BACKGROUND OF THE INVENTION

The purification of gases by means of physically acting scrubbing solutions and particularly the removal of $H_2S$ and $CO_2$ from gases by such scrubbing processes has been known for a long time.

Processes of this kind have been described in German Pat. No. 1,494,806 and in U.S. Pat. Nos. 3,531,917 and 3,710,546.

It is also known to regenerate the laden absorbent solution by a pressure relief, heating or stripping treatment or by a combination of such treatments. Suitable physically acting scrubbing solutions include methanol and N-methylpyrrolidone (NMP). The gas scrubbers are usually operated at temperatures in the range from $+60°$ to $-80°$ C.

During the scrubbing of the gas the scrubbing solution absorbs not only impurities but also certain quantities of the valuable gases which constitute the main constituents of the gas to be scrubbed.

OBJECT OF THE INVENTION

It is an object of the invention to provide an improved process for treating scrubbing solutions which can recover the valuable gases as completely as possible from the absorbent solution streams which have left the gas scrubbing zones.

SUMMARY OF THE INVENTION

This is accomplished in accordance with the invention in that the first scrubbing solution stream is pressure-relieved into a first pressure relief zone with a pressure reduction of at least 5 bars so as to liberate a high-$CO_2$ gas, the second scrubbing solution stream is partly pressure-relieved into a second pressure relief zone which contains exchange-promoting elements, the liberated gas from the first pressure relief zone is passed upwardly through the second pressure relief zone in a countercurrent to the second scrubbing solution stream, a gas mixture containing $CO_2$ and at least one valuable gas is withdrawn from the top of the second pressure relief zone, and the two scrubbing solutions streams leaving the pressure relief zones are regenerated.

The process in accordance with the invention is mainly applicable where the two scrubbing solution streams leaving the gas scrubbers contain $C_2$ in different concentrations.

In the first pressure-relief zone a high $CO_2$ content of the laden first absorbent solution will cause not only the released $CO_2$ but also a large part of any absorbed valuable gases to enter the liberated gas.

Having a lower $CO_2$ content, the second absorbent solution stream introduces $CO_2$ into the second pressure relief zone only at a relatively low rate. But in the second pressure relief zone the flashed-off gas from the first pressure relief zone exerts a strong stripping action, by which the valuable gases are stripped from the second scrubbing solution.

A substantial part of the $CO_2$ contained in the flashed-off gas from the first pressure relief zone is re-absorbed in the second pressure relief zone, as is desirable. As a result, the gas mixture withdrawn from the top of the second pressure relief zone has a high content of the valuable gases and the latter are recovered in that the gas mixture is fed to one of the gas-scrubbing zones.

This recovery of the valuable gases is desirable also for the quality of the regeneration of the scrubbing solution streams because otherwise the valuable gases would be disturbing in the exhaust gases produced by the regeneration. The gas mixture which is withdrawn can be used also for other purposes, for instance, as a fuel gas.

The two pressure relief zones may be arranged one above the other and the second scrubbing solution stream leaving the second zone may be fed to the first pressure relief zone.

The first scrubbing solution stream is suitably pressure-relieved at the entrance to the first pressure relief zone to 0.5 to 1.2 times the partial pressure of the $CO_2$ in the gas. In this manner the desired $CO_2$ concentration in the liberated gas can be adjusted based upon the rate at which $CO_2$ is to be absorbed in the second pressure relief zone. The pressure in the two pressure-relief zones should be between about 5 and 25 bars.

The first gas which is fed to the first gas-scrubbing zone may differ at least in $CO_2$ content from the second gas fed to the second gas-scrubbing zone. In most cases the $CO_2$ content of the first gas is at least 1.5 times the $CO_2$ content of the second gas.

It is possible to state by way of example that the $CO_2$ content of the first gas is in the range from about 20 to 40% by volume and the $CO_2$ content of the second gas is about 2 15% by volume. The first gas may consist, e.g., of a shift-converted water gas and the second gas may consist of a water gas which has not been shift-converted. The main constituents of water gas are hydrogen and carbon oxides and all or most of the CO is removed by the shift conversion reaction ($CO+H_2O = CO_2+H_2$). Instead of water gas, the first and second gases may consist of synthesis gases or high-methane gases.

In the two gas scrubbers, the known physically acting solvents are used, particularly methanol and NMP. The temperatures in the scrubbing zones are in the range from $+60°$ to $-80°$ C.

BRIEF DESCRIPTION OF THE DRAWING

The above and other objects, features and advantages of our invention will become more readily apparent from the following description, reference being made to the accompanying highly diagrammatic drawing.

The sole FIGURE is a flow diagram illustrating the invention.

SPECIFIC DESCRIPTION

The first gas to be purified, which may have a relatively high $CO_2$ content, is fed in line 2 to the first gas-scrubbing zone 1.

Regenerated scrubbing solution comes from line 3. The purified gas is discharged in line 4.

The first scrubbing solution stream leaves the first gas-scrubbing zone 1 via line 5.

Similarly, the second gas is fed in line 8 to the second gas-scrubbing zone 9, which is fed with regenerated absorbent solution via line 10. The second gas which has been scrubbed leaves the second gas-scrubbing zone 9 via line 11. The laden second scrubbing solution stream is withdrawn in line 12.

In most cases the $CO_2$ content of the first gas in line 2 is at least 1.5 times the $CO_2$ content of the second gas in line 8. The exchange of matter between the gas and liquid in the two gas-scrubbing means 1 and 9 is promoted by plates or packing elements (material-exchange-promoting elements), which are known per se and are not shown for the sake of simplicity.

The first scrubbing solution stream is fed in line 5 to the first pressure-relief zone 15 and is pressure-relieved therein with a pressure reduction by at least 5 bars. The pressure-relief zone 15 may be constituted by an empty container.

The gas liberated from the first pressure-relief zone 15 is fed via line 16 to the second pressure-relief zone 17, which contains exchange-promoting elements 18 such as plates, packing elements or baffles.

The second scrubbing solution stream is fed in line 12 to the top portion of the second pressure relief zone 17 and is partly pressure-relieved in this zone. The pressures in the two pressure relief zones 15 and 17 are usually about the same and lie in the range from 5 to 25 bars.

The liberated gas from line 16 rises in the second pressure relief zone 17 in a countercurrent (counter flow) to the second scrubbing solution and exerts there a strong stripping action as a result of which the valuable gases are released. A considerable part of the $CO_2$ contained in the flashed-off gas in line 16 is re-absorbed by the second absorbent solution and for this reason does not appear in the top gas from the second pressure relief zone. That top gas contains valuable gases and $CO_2$ and is fed to the second gass-scrubbing zone 9 through the compressor 20 and the line 21. A major part of the valuable gases which are thus recycled will be found in the pure gas in line 11.

The two scrubbing solution streams which have left the pressure relief zones 15 and 17 are fed in lines 23 and 24 to a conventional regenerator 25, in which the loadings of the solutions are removed by at least one of the treatments consisting is recycled in lines 3 and 10 per the reuse which has been described hreinbefore.

SPECIFIC EXAMPLE

In an embodiment of the process which corresponds to that shown on the drawing, first and second gases are scrubbed with methanol in the two gas-scrubbing zones 1 and 9 at about 37 bars. The two gases are composed as follows

|  | First gas | Second gas |
| --- | --- | --- |
| CO (mole percent) | 3 | 49 |
| $H_2$ (mole percent) | 58 | 34 |
| $CO_2$ (mole percent) | 39 | 17 |

Scrubbing solution is fed at a rate of 66 m³/h to the first scrubbing zone 1 and at a rate of 81 m³/h to the second scrubbing zone 9. The scrubbing solution streams in lines 5, 12, 23, 24 contain the following loadings per hour. $H_2$ and CO are the valuable gases:

| Line | 5 | 12 | 23 | 24 |
| --- | --- | --- | --- | --- |
| $CO_2$ (kilomoles) | 351 | 192 | 310 | 222 |
| $H_2$ (kilomoles) | 8.03 | 4.2 | 0.6 | 1.7 |
| CO (kilomoles) | 0.71 | 13.4 | 0.09 | 1.3 |

This corresponds to the following loadings per m³ of the scrubbing solution in lines 5 and 12:

|  | Line 5 | Line 12 |
| --- | --- | --- |
| $CO_2$ (moles/m³) | 5318 | 2370 |
| $H_2$ (moles/m³) | 122 | 52 |
| CO (moles/m³) | 11 | 165 |

The pressure in the two pressure relief zones is about 11 bars.

Gases at the rates stated in column A of the following table are found in the line 21 for recycling the valuable gases. For a comparison/in column B the total gas rates are stated which would flow in lines 16 and 21 if the liberated gas in line 16 were not fed to the second pressure relief zone but would be collected separately.

|  | A | B |
| --- | --- | --- |
| $CO_2$ (kilomoles/h) | 11.6 | 47.4 |
| CO + $H_2$ (kilomoles/h) | 22.6 | 20.1 |

In case A, the rate of residual CO in the absorbent solution streams fed to the regenerator totals 1.51 kilomoles per hour in case A and 4.79 kilomoles per hour in case B. It is apparent from the table that in the process in accordance with the invention (column A) the total gas rate is low so that only a small work of compression is required to recycle the gases. At the same time, a higher proportion of the valuable gases CO+$H_2$ is recovered.

If desired, a portion of the scrubbing solution from line 24 can be pumped to the first pressure relief zone as represented by dot-dash lines at 26.

We claim:
1. A process for the treatment of two laden scrubbing solutions derived from different gas-scrubbing zones and which, in said zones, have absorbed carbon dioxide and at least one valuable gas selected from the group which consists of carbon monoxide, hydrogen and methane by the physical dissolution of the absorbed gases at a pressure of 10 to 100 bars, said process comprising the steps of:
   (a) pressure-relieving a first of said scrubbing solutions into a first pressure-relief zone with a pressure reduction of at least 5 bars so as to liberate a high-$CO_2$ gas;
   (b) pressure-relieving a second of said scrubbing solutions into a second pressure-relief zone containing material-exchange-promoting elements;
   (c) passing the gas liberated in said first zone upwardly through said second zone in counterflow to the second scrubbing solution during the pressure-relieving thereof in said second zone to form a gas mixture containing $CO_2$ and said one of said valuable gases;
   (d) recovering said gas mixture containing $CO_2$ and said one of said valuable gases from a top of said second zone; and

(e) withdrawing the respective scrubbing solutions from the respective zones and regenerating the withdrawn scrubbing solutions.

2. The process defined in claim 1 wherein at least part of the second scrubbing solution is withdrawn from said second zone and is introduced into said first zone before regeneration in step (e).

3. The process defined in claim 1, further comprising the step of:
feeding at least part of the gas mixture containing $CO_2$ and said one of said valuable gases from said top of said second zone to one of said gas-scrubbing zones.

4. The process defined in claim 1 wherein the pressure in each of said pressure-relief zones is maintained at about 5 to about 25 bars.

5. The process defined in claim 4 wherein at least part of the second scrubbing solution is withdrawn from said second zone and is introduced into said first zone before regeneration in step (e).

6. The process defined in claim 5, further comprising the step of:
feeding at least part of the gas mixture containing $CO_2$ and said one of said valuable gases from said top of said second zone to one of said gas-scrubbing zones.

* * * * *